United States Patent
Nishikawa et al.

(10) Patent No.: US 7,107,291 B2
(45) Date of Patent: *Sep. 12, 2006

(54) INFORMATION SYSTEM AND DATA ACCESS METHOD

(75) Inventors: Norifumi Nishikawa, Machida (JP);
Shoichi Minami, Yokohama (JP);
Takanobu Otani, Yokohama (JP);
Yasuharu Namba, Kawasaki (JP);
Hirotaka Mizuno, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/049,570

(22) Filed: Feb. 1, 2005

(65) Prior Publication Data

US 2005/0154770 A1 Jul. 14, 2005

Related U.S. Application Data

(63) Continuation of application No. 10/387,351, filed on Mar. 11, 2003, now Pat. No. 6,850,957.

(30) Foreign Application Priority Data

Mar. 12, 2002 (JP) ............................. 2002-067412

(51) Int. Cl.
*G06F 17/30* (2006.01)
(52) U.S. Cl. ...................... 707/201; 707/200; 707/202; 707/102; 707/100; 709/232; 709/249; 709/313; 717/119; 717/120; 717/142; 717/161; 717/162
(58) Field of Classification Search .................. 707/2, 707/7–10, 100, 102, 205, 200–202
See application file for complete search history.

(56) References Cited

U.S. PATENT DOCUMENTS

| 6,651,070 | B1 | 11/2003 | Hirashima et al. |
| 6,658,417 | B1 * | 12/2003 | Stakutis et al. ............... 707/10 |
| 6,671,687 | B1 * | 12/2003 | Pederson et al. .............. 707/9 |
| 6,732,124 | B1 | 5/2004 | Koseki et al. |
| 6,754,679 | B1 | 6/2004 | Oheda |

OTHER PUBLICATIONS

"Populating the ODS from relational sources," IBM Redbook Building the Operational Data Store on DB2 Warehouse Manager, Baragoin et al. eds., IBM Corporation San Jose, CA, pp. 91-121 (2001).

* cited by examiner

*Primary Examiner*—Vibol Tan
(74) *Attorney, Agent, or Firm*—Townsend and Townsend and Crew LLP

(57) ABSTRACT

A data access method in an information system including a plurality of data utilization systems connected to a network N1, and a plurality of data provision systems connected to a network, wherein a data utilization system transmits a request for utilizing data in a data provision system to another data utilization system P2 through the network N1, the data utilization system, upon receipt of the data utilization request, transmits a processing execution request corresponding to the data utilization request to the data provision system through the network N2, the data provision system, upon receipt of the execution request, executes processing corresponding to this execution request and transmits necessary data to the data provision system through the network, and the data provision system receives the data and stores the same.

6 Claims, 12 Drawing Sheets

FIG. 11

| PROCESSING EXECUTION SITE | PROCESSING CONTENT | INTERVENING SYSTEM | TRANSFER DESTINATION | |
|---|---|---|---|---|
| D2 | SORT, TOTALIZATION | NON | D1 | 1110a |
| D1 | SORT, TOTALIZATION | NON | D1 | 1110b |

FIG. 12

| PROCESSING EXECUTION SITE | PROCESSING CONTENT | INTERVENING SYSTEM | TRANSFER DESTINATION | DATA | |
|---|---|---|---|---|---|
| D2 | SORT, TOTALIZATION | NON | D1 | ... | 1210a |
| D1 | SORT, TOTALIZATION | NON | D1 | ... | 1210b |

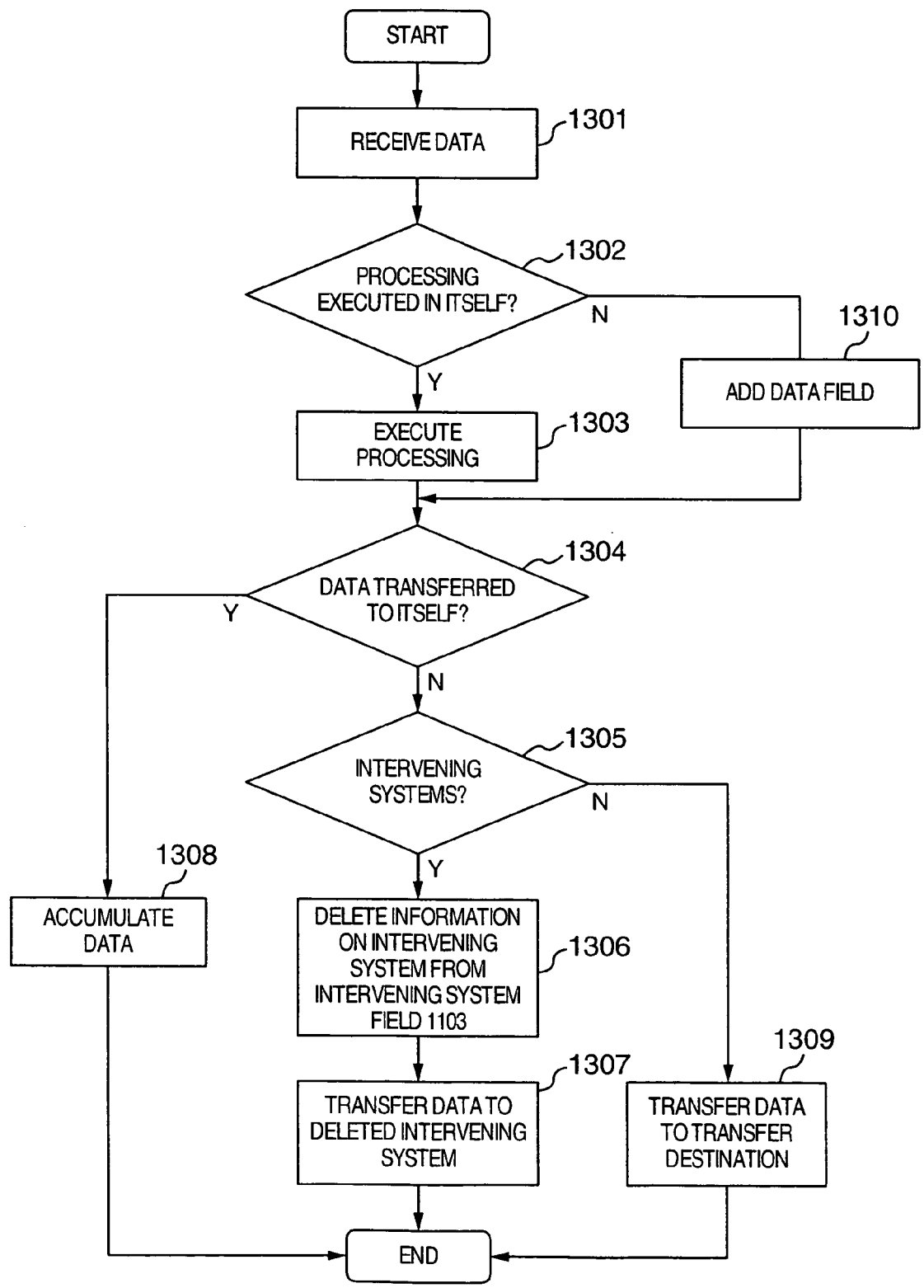

INFORMATION SYSTEM AND DATA ACCESS METHOD

This application is a continuation of Ser. No. 10/387,351 filed Mar. 11, 2003, now U.S. Pat. No. 6,850,957, which claims foreign priority of Japan 2002-067412 filed Mar. 12, 2002.

BACKGROUND OF THE INVENTION

The present invention relates to a data access method in an information system, and an information system.

FIG. 7 illustrates a standard system configuration in a recent information system which is applied, for example, to businesses such as online, accounting and the like in a bank, inventory control in a trading company, a logistics company or the like, seat reservation in a railway company or an airline company, and so forth.

A transaction-based system P2 and a transaction-based database D2 connected thereto are used in routine operations which always require high speed properties such as a high response, a high throughput and the like, for example, an online service in a bank, acceptance and ordering of products, inventory control for products, accounting/finance, and the like. OLTP (On-Line Transaction Processing) or the like is a representative example.

On the other hand, an information-based system P1 in the figure is used in non-routine operations which are performed using data accumulated in the transaction-based database such as transactions, log journal, and the like, for example, an analysis on trends of product sales, a time-series transition of numbers of products in stock, an analysis on purchase patterns, decision making support operations, and the like. Processing using OLAP (Online Analytical Processing) or the like is a representative example, in which case the information-based database D1 functions as a data warehouse. The information-based system P1 and information-based database D1 generally have low requirements to real time and high speed properties, as compared with the transaction-based system P2 and transaction-based database D2.

These systems and databases are generally configured by a general-purpose machine, a PC server and the like in which OS and a variety of applications have been installed. The systems and databases can be configured independently or in a combination of plural units.

SUMMARY OF THE INVENTION

In the information system, for example, when the information-based system P1 utilizes data stored in the transaction-based database D2 for analyzing transactions, the information-based system P1 must acquire necessary data from the transaction-based database D2.

In such a case, the information-based system P1 first transmits a request for utilizing necessary data to the transaction-based system P2 through a network N1 (S710). Upon receipt of the request for utilization, the transaction-based system P2 acquires associated data from the transaction-based database D2 (S711), and transmits this to the information-based system P1 through the network N1 (S712). The information-based system P1 receives the data which is stored in the information-based database D1 (S713).

Here, LAN, for example, is used as the network N1, wherein the data transmission affects the traffic on the LAN, and affects other communications between the information-based system P1 and transaction-based system P2. Also, during a transfer of the data, resources of the information-based system P1 and transaction-based system P2 are consumed.

On the other hand, the degree of requirements for the real time and high speed properties for each component of the information system such as the information-based system P1, transaction-based system P2, information-based database D1, transaction-based database D2, and the like generally vary over time from one system to anther and from one database to another. Therefore, for efficiently operating the information system, relatively heavy processing such as a data transfer is preferably performed in a time zone in which neither the real time property nor the high speed property is required, from a view point of the management of the information system.

The present invention has been made from such a view point, and it is an object of the invention to provide a data access method in an information system which is capable of more efficient operations, and an information system.

A principle invention of the present invention for achieving this object is a data access method in an information system comprising a plurality of data utilization systems connected to networks N1 and N2, and a plurality of data provision systems connected to the network N2, characterized in that:

a data utilization system P1 transmits a request for utilizing data in a data provision system D2 to another data utilization system P2 through the network N1, the data utilization system P2, upon receipt of the data utilization request, transmits a processing execution request corresponding to the data utilization request to the data provision system D2 through the network N2, the data provision system D2, upon receipt of the execution request, executes processing corresponding to the execution request and transmits necessary data to another data provision system D1 through the network N2, and the data provision system D1 receives the data and stores the same.

Other objects, features and advantages of the present invention will become apparent from the following description of embodiments of the present invention in connection with the accompanying drawings.

BRIEF DESCRIPTION OF THE DRAWINGS

FIG. 11 is an example of an execution request sent from a data utilization system to a data provision system in the present invention;

FIG. 12 is an exemplary execution request and data sent from a data provision system to a data provision system in the present invention; and FIG. 13 is exemplary processing executed in a data provision system.

DETAILED DESCRIPTION OF THE EMBODIMENTS

Figure 1:
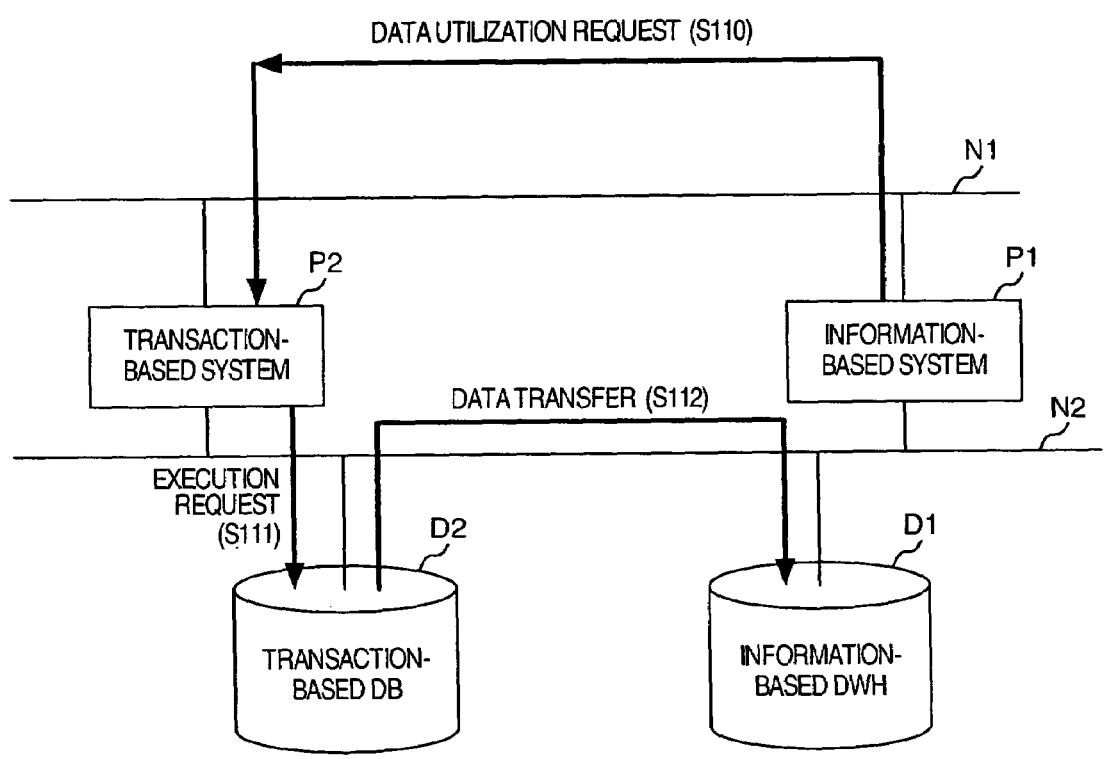
FIG. 1 is a diagram illustrating the configuration of an information system according to a first embodiment of the present invention.

At least the following aspects become apparent from the following disclosure.

A data access system in an information system comprising a plurality of data utilization systems connected to networks N1 and N2, and a plurality of data provision systems connected to the network N2, characterized in that a data utilization system P1 transmits a request for utilizing data in a data provision system D2 to another data utilization system P2 through the network N1, the data utilization system P2, upon receipt of the data utilization request, transmits a processing execution request corresponding to the data utilization request to the data provision system D2 through the network N2, the data provision system D2, upon receipt of the execution request, executes processing corresponding to the execution request and transmits necessary data to another data provision system D1 through the network N2, and the data provision system D1 receives the data and stores the same, and a data access system in an information system comprising a plurality of data utilization systems connected to networks N1 and N2, and a plurality of data provision systems connected to the network N2, characterized in that a data utilization system P1 transmits a request for utilizing data in a data provision system D2 to another data utilization system P2 through the network N1, the data utilization system P2, upon receipt of the data utilization request, transmits a processing execution request corresponding to the data utilization request to the data provision system D2 through the network N2, the data provision system D2, upon receipt of the execution request, transmits data and the execution request to a data provision system D1 through the network N2, and the data provision system D1 receives the execution request and the data, executes processing corresponding to the execution request, and stores necessary data.

Here, the data utilization system P1 is, for example, the aforementioned information-based system, and the data utilization system P2 is, for example, the aforementioned transaction-based system. Also, the data provision system D1 is, for example, the aforementioned information-based database, and the data provision system D2 is, for example, the aforementioned transaction-based database. Further, thee data provision systems may be implemented as a storage device system.

The network N1 is, for example, a LAN (Local Area Network) in accordance with the TCP/IP protocol, and the network N2 is, for example, a SAN (Storage Area Network) which is built using a fiber channel (Fibre Channel) or the like.

According to this data access method, a data transfer is mainly performed by a communication between the data provision systems D1, D2 through the network N2. Therefore, the data transfer hardly affects the traffic on the network N1, and hardly consumes resources of the data utilization systems P1, P2.

A data access method in an information system comprising a plurality of data utilization systems connected to networks N1 and N2, a plurality of data provision systems connected to the network N2, and a request management center S connected to the network N1, which is characterized in that a data utilization system P1 transmits a message for requesting utilization of data in a data provision system D2 to the request management center S through the network N1, the request management center S, upon receipt of the message, transmits a data utilization request corresponding to the message to a data utilization system P2 through the network N1 at an appropriate timing, the data utilization system P2, upon receipt of the data utilization request, transmits a processing execution request corresponding to the data utilization request to the data provision system D2 through the network N2, the data provision system D2, upon receipt of the execution request, executes processing corresponding to the execution request and transmits necessary data to the data provision system D1 through the network N2, and the data provision system D1 receives the data and stores the same, and a data access method in an information system comprising a plurality of data utilization systems connected to networks N1 and N2, a plurality of data provision systems connected to the network N2, and a request management center S connected to the network N1, which is characterized in that a data utilization system P1 transmits a message for requesting utilization of data in a data provision system D2 to the request management center S through the network N1, the request management center S, upon receipt of the message, transmits a data utilization request corresponding to the message to a data utilization system P2 through the network N1 at an appropriate timing, the data utilization system P2, upon receipt of the data utilization request, transmits a processing execution request corresponding to the data utilization request to the data provision system D2 through the network N2, the data provision system D2, upon receipt of the execution request, transmits data and the execution request to the data provision system D1 through the network N2, and the data provision system D1 receives the execution request and the data, executes processing corresponding to the execution request, and stores necessary data.

In this data access method, a message from the data utilization system P1 is transmitted to the request management center S, and the request management center S transmits a data utilization request corresponding to the message to the data utilization system P2 at an appropriate timing. Here, if the appropriate timing is within a time zone in which a high real time property or high speed property is not required, for example, for the data utilization system P2, a main operation performed by the information system is less affected, thereby permitting an efficient operation of the information system.

A data access method in an information system comprising one or more data utilization systems connected to networks N1 and N2, a plurality of data provision systems connected to the network N2, and an access intermediation center connected to networks N2 and N3, which is characterized in that the access intermediation center, upon receipt of an access request through the network N3, transmits a processing execution request corresponding to the access request to a data provision system D1 through the network N2, the data provision system D1, upon receipt of the execution request, executes processing corresponding to the execution request and transmits necessary data to a data provision system D0 through the network N2, and the data provision system D0 receives the data and stores the same.

Here, the network N3 is, for example, the Internet, and the access intermediation center is, for example, a Web server on the Internet which has a database association function (in the following description, referred to as a "channel-based system").

In this data access method, for example, when the access intermediation center wishes to utilize data, for example, in the data provision system D1 which is the aforementioned information-based database, data to be utilized is copied to the data provision system D0 (in the following description, referred to as a "channel-based database") to utilize the copied data in the data provision system D0. In this way, a load given to the data provision system D1 can be reduced when the access intermediation center utilizes data in the data provision system D1, thereby permitting an efficient operation of the information system.

A data access method in an information system comprising one or more data utilization systems connected to networks N1 and N2, a plurality of data provision systems connected to the network N2, an access intermediation center connected to networks N2 and N3, and a request management center S connected to the network N2, which is characterized in that the access intermediation center receives an access request through the network N3, and transmits a message for requesting utilization of data in a data provision system D2 to the request management center S through the network N1, the request management center S, upon receipt of the message, transmits a processing execution request corresponding to the message to a data provision system D2 at an appropriate timing, the data provision system D2, upon receipt of the execution request, executes processing corresponding to the execution request and transmits necessary data to a data provision system through the network N2, and the data provision system D1 receives the data and stores the same.

In this data access method, a message from the access intermediation center is transmitted to the request management center S, and the request management center S transmits a processing execution request corresponding to the message to the data provision system D1 at an appropriate timing. Here, if the appropriate timing is within a time zone in which a high real time property or a high speed property is not required, for example, for the data provision system D1, a main service provided by the information system is less affected, thereby permitting an efficient operation of the information system.

A data access method in an information system comprising a plurality of data utilization systems connected to networks N1 and N2, a plurality of data provision systems connected to the network N2, and an access intermediation center connected to networks N1, N2 and N3, which is characterized in that the access intermediation center receives an access request through the network N3, and transmits a request for utilizing data in a data provision system D2 to a data provision system P1 through the network N1, the data utilization system P1, upon receipt of the data utilization request, transmits a request for utilizing data in the data provision system D2 to another data utilization system P2 through the network N1, the data utilization system P2, upon receipt of the data utilization request, transmits a processing execution request corresponding to the data utilization request to the data provision system D2 through the network N2, the data provision system D2, upon receipt of the execution request, executes processing corresponding to the execution request and transmits necessary data to a data provision system D0 through the network N2, and the data provision system D0 receives the data and stores the same. The data provision system D2 generates the necessary data, for example, in association with the other data provision system through the network N2 in the processing of the execution request.

In this data access method, for example, when the access intermediation center wishes to utilize data, for example, in the data provision system D1 which is the aforementioned information-based database, data to be utilized, which is eventually extracted by an associative operation of the data utilization systems P1, P2 and data provision system D1, D2, is copied to the data provision system D0 to utilize the copied data in the data provision system D0. In this way, a load given to the data provision system D1 can be reduced when the access intermediation center utilizes data in the data provision system D1, thereby permitting an efficient operation of the information system. Also, the access intermediation center can set up data of a nature which could not be otherwise provided without association of the data utilization systems P1, P2 and data provision systems D1, D2, in the data provision system D0 only through a single transmission of a data utilization request. Specific example of the data having the nature as mentioned above is data associated with totalization which cannot be available before it is processed, such as bill data, payment data and the like.

A data access method in an information system comprising a one or more data utilization systems connected to networks N1 and N2, a plurality of data provision systems connected to the network N2, an access intermediation center connected to networks N1, N2 and N3, and a request management center S connected to the network N1, characterized in that the access intermediation center receives an access request through the network N3, and transmits a message for requesting utilization of data in a data provision system corresponding to the access request to the request management center S through the network N1, the request management center S, upon receipt of the message, transmits a data utilization request corresponding to the message to a data utilization system through the network N1 at an appropriate timing, the data utilization system, upon receipt of the data utilization request, transmits a processing execution request corresponding to the data utilization request to a data provision system through the network N2, the data provision system, upon receipt of the execution request, executes processing corresponding to the execution request and transmits necessary data to another data provision system through the network N2, and the other data provision system receives the data and stores the same.

In this data access method, a message from the access intermediation center is transmitted to the request management center S, and the request management center S transmits a data utilization request corresponding to the message to the data utilization system at an appropriate timing. Here, if the appropriate timing is within a time zone in which a high real time property or a high speed property is not required, for example, for the data utilization system and data provision system, a main service provided by the information system is less affected, thereby permitting an efficient operation of the information system. Also, the access intermediation center can set up data in the data provision system D0 only through a single transmission of a data utilization request.

The processing executed by the data provision system corresponding to the execution request includes any processing of search, update, deletion and filtering of data in the data provision system. The data provision system which is requested to permit utilization of data therein from another system is a system which requires, for example, a real time property or a high speed property. The data utilization system P2 is, for example, a system which requires a higher real time property than the data utilization system P1.

The request management center S manages the received messages, for example, in accordance with a queuing scheme, and transmits a data utilization request corresponding to each of the messages to the data utilization system or the data provision system associated therewith in accordance with a FIFO scheme.

The request management center S, for example, stores the received messages, receives information indicating whether or not the data utilization system or data provision system is ready for accepting a processing request form the request management center S from the data utilization system or data provision system, and determines whether or not a data utilization request corresponding to the stored message should be transmitted based on the information.

The request management center S stores the messages, receives a processing completion notice for a data utilization request corresponding to a certain message, and then transmits a data request corresponding to another one of the stored messages.

The request management center S also transmits the execution request or the data utilization request in accordance with an operating situation of the data utilization system or the data provision system.

The message includes identification information, wherein the request management center S stores a correspondence of the identification information to one or more of the data utilization systems and data provision systems. Upon receipt of the message, the request management center S compares the identification information included in the message with the correspondence to transmit the data utilization request or the execution request to the data utilization system or the data provision system corresponded to the identification information.

The access intermediation center transmits a message, a data utilization request or a processing execution request corresponding to the access request in accordance with an operating situation of the data utilization system or the data provision system.

The message includes identification information, wherein the access intermediation center stores a correspondence of the identification information to one or more of the data utilization systems and data provision systems. Upon receipt of the access request, the access intermediation center compares the identification information included in the access request with the correspondence to transmits the message or the processing execution request to the data provision system corresponded to the identification information. The identification information is, for example, information which identifies a source of the access request.

In the foregoing description, the terms "utilization system" and "provision system" are merely used for convenience, and a data utilization system may have a feature of providing data to other systems, while a data provision system may have a feature of utilizing data in other systems.

FIG. 1 is a diagram illustrating the configuration of an information system which is described as a first embodiment of the present invention.

A network N1 comprises, for example, a LAN or the like, as mentioned above, while a network N2 comprises, for example, a SAN or the like. While it is assumed in FIG. 1 that the network N1 is used for controlling a small amount of data at a low speed and a low cost, and the network N2 is used for transmitting a large amount of data at a high speed and a high cost, the networks are not necessarily limited to those specifications.

An information-based system P1 and a transaction-based system P2 are respectively connected to both the networks N1 and N2. An information-based database D1 and a transaction-based database D2 are connected to the network N2. Specific examples of functions and roles of each system are similar to the foregoing.

Description will be made on processing performed in this information system when the information-based system P1 needs data in a data provision system D2.

First, the information-based system P1 transmits a request for utilizing data in the data provision system D2 to the transaction-based system P2 through the network N1. In this event, the information-based system P1 has been previously registered with information indicative of the transaction-based system P2, as a destination to which a utilization request is transmitted, by a manager or the like (S110). On the other hand, the transaction-based system P2, which receives the data utilization request, transmits a processing execution request (S111) corresponding to the data utilization request to the transaction-based database D2 through the network N2. Here, the execution request may include any of processing such as a search, update, delete and filtering, by way of example. The transaction-based system P2 also determines a destination to which the execution request is transferred based on information indicative of a data provision system included in the received utilization request.

Upon receipt of the execution request, the data provision system D2 executes the processing corresponding to the execution request, and transmits necessary data to the data provision system D1 through the network N2 (S112).

Upon receipt of the data, the information-based database D1 stores the data. Subsequently, the information-based system P1 accesses the information-based database D1 to utilize the data stored therein.

In this processing, the data transfer from the transaction-based database D2 to the information-based database D1 is mainly performed through the network N2. Also, since the data transfer is performed mainly between the information-based database D1 and transaction-based database D2, no resources of the information-based system P1 and transaction-based system P2 will be consumed during the data transfer.

Figure 2:
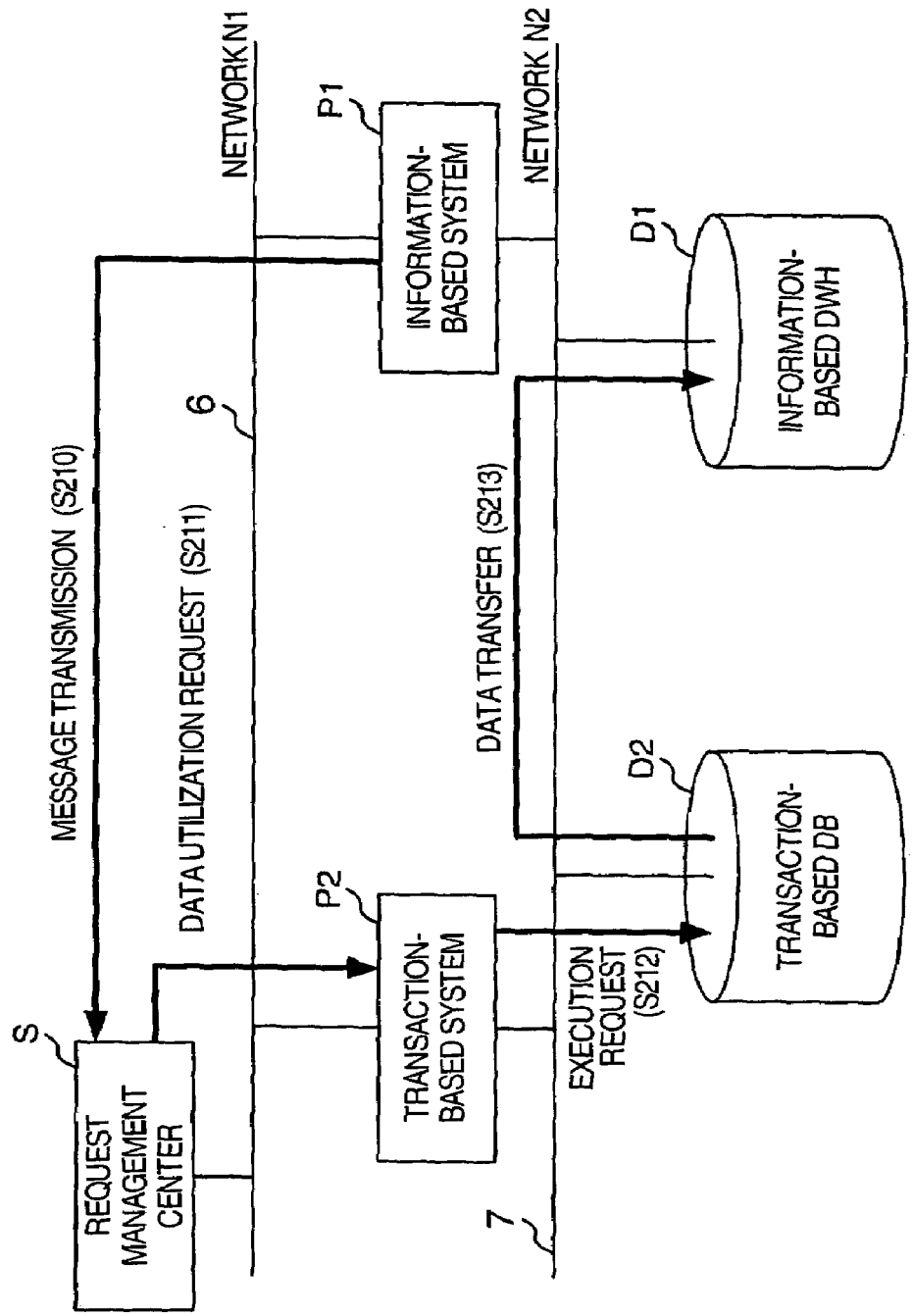
FIG. 2 is a diagram illustrating the configuration of an information system according to a second embodiment of the present invention.

FIG. 2 is a diagram illustrating the configuration of the information system P1 which is described as a second embodiment of the present invention. The configuration in FIG. 2 is basically the same as that of the first embodiment except that a request management center S is connected to the network N1.

Description will be made on the operation of the information system when the information-based system P1 needs data in the data provision system D2, as is the case with the first embodiment.

First, the information-based system P1 transmits a message for requesting utilization of data in the transaction-based database D2 to the request management center S through the network N1. In this event, the information-based system P1 has previously stored information such as an address indicative of the request management center, to which the message is to be transmitted, by a user or the like (S210). Upon receipt of the message, the request management center S transmits a data utilization request corresponding to the message to the transaction-based system P2 through the network N1. In this event, the request management center S determines a destination to which the utilization request is transferred in accordance with information included in the message (S211).

Upon receipt of the data utilization request, the transaction-based system P2 transmits a processing execution request corresponding to the data utilization request to the transaction-based database D2 through the network N2 (S212). Here, the execution request may include any of processing such as a search, update, delete and filtering, by way of example.

Upon receipt of the execution request, the transaction-based database D2 executes the processing corresponding to the execution request, and transmits necessary data to the information-based database D1 through the network N2 (S213).

Upon receipt of the data, the information-based database D1 stores the data. Subsequently, the information-based system P1 accesses the information-based database D1 to utilize the data stored therein.

In the foregoing processing, the request management center S receives a message from the information-based system P1. Also, as described later, the request management center S can store messages, and the request management center S monitors the transaction-based system P2 and transaction-based database D2 for operating conditions, and transmits a data utilization request (S211) to the transaction-based system P2, for example, when the transaction-based system P2 and transaction-based database D2 have small processing loads. Therefore, the information system P1 is operated in an efficient manner.

Also, in the processing of this embodiment, a data transfer from the transaction-based database D2 to the information-based database D1 is mainly performed through the network N2. Therefore, the traffic will not be increased on the network N1. Also, since the data transfer is mainly performed between the information-based database D1 and transaction-based database D2, no resources of the information-based system P1 and transaction-based system P2 will be consumed during the data transfer.

Figure 3:
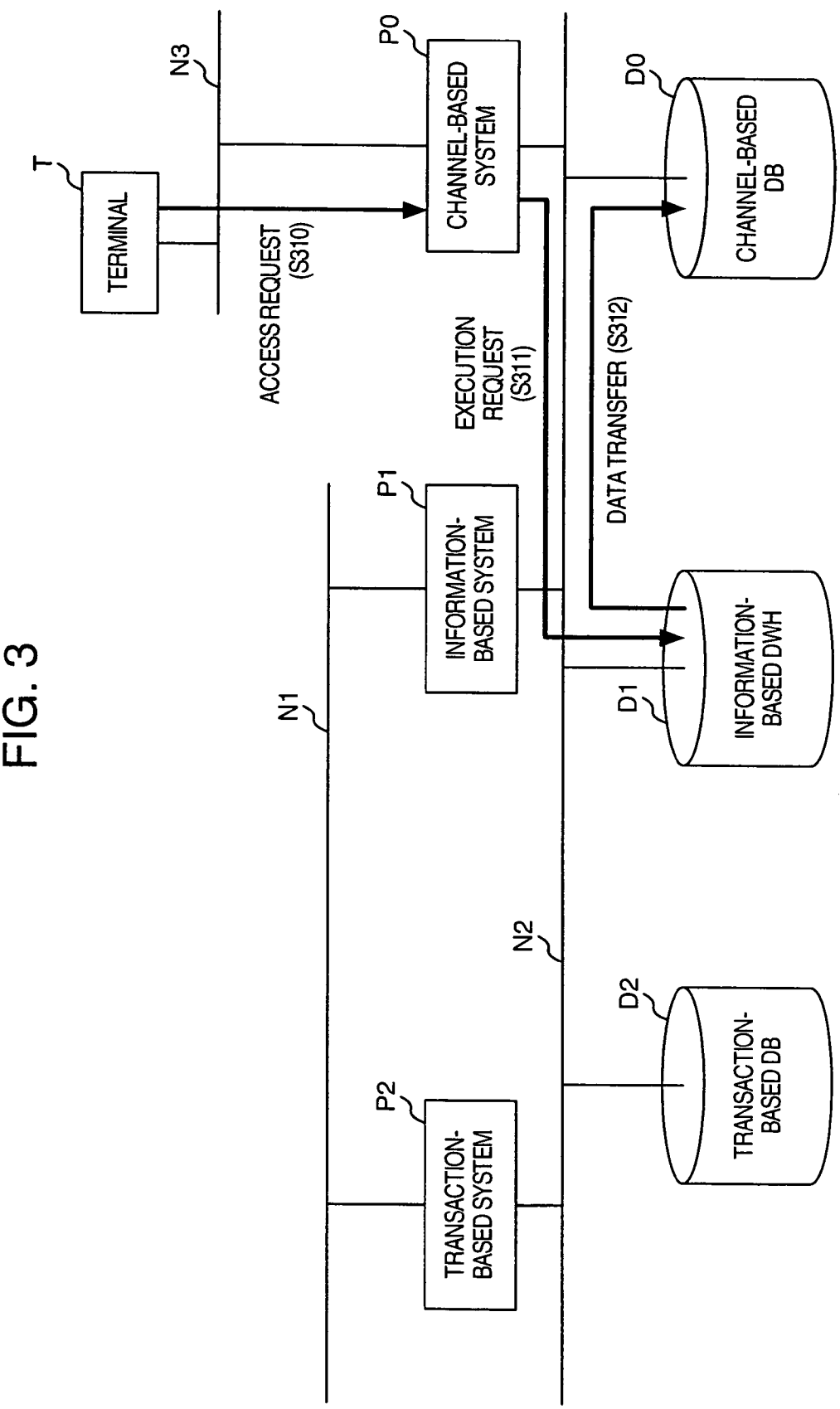
FIG. 3 is a diagram illustrating the configuration of an information system according to a third embodiment of the present invention.

FIG. 3 is a diagram illustrating the configuration of an information system which is described as a third embodiment of the present invention. FIG. 3 additionally comprises a channel-based database D0 which is one of data provision systems connected to the network N2, an access intermediation center P0 connected to the network N2 and network N3, and a terminal T connected to a network N3, in addition to the configuration of the first embodiment.

The network N3 is, for example, the Internet, and the terminal T is, for example, a computer connected to the Internet. The access intermediation center P0 is a device such as a Web server which responds to an access request sent from the terminal T connected to the network N3 by transmitting a Web page and the like to the terminal T. For example, when an access is made from the terminal T through the Internet, the access intermediation center P0 extracts data from the information-based database D1 and transaction-based database D2, and edits the contents for transmission to the terminal T.

In the following, description will be made on a process which is performed when the access intermediation center P0 receives an access request sent from the terminal T, from a search in the information-based database D1 for information required for a response to the request to a transmission of data describing the result to the terminal T.

First, upon receipt of an access request from the terminal T through the network N3 (S310), the access intermediation center P0 transmits a processing execution request corresponding to the access request to the information-based database D1 through the network N2 (S311).

Upon receipt of the execution request, the information-based database D1 executes the processing corresponding to the execution request, and transmits necessary data to the channel-based database D0 through the network N2 (S312). Here, the execution request may include any of processing such as a search, update, delete and filtering, by way of example.

The channel-based database D0 receives the data and stores the same. In this way, the channel-based system P0 can utilize data in the information-based database D1 by accessing the channel-based database D0, and the channel-based system P0 utilizes the data to generate response information to the terminal T, and describes the response information, for example, on a Web page for transmission.

Thus, in the foregoing processing, the channel-based system P0 accesses the channel-based database D0 to perform the processing which should be essentially performed by accessing the information-based database D1. Therefore, a processing load burdened on the information-based database D1 is minimized to efficiently operate the information system.

Figure 4:
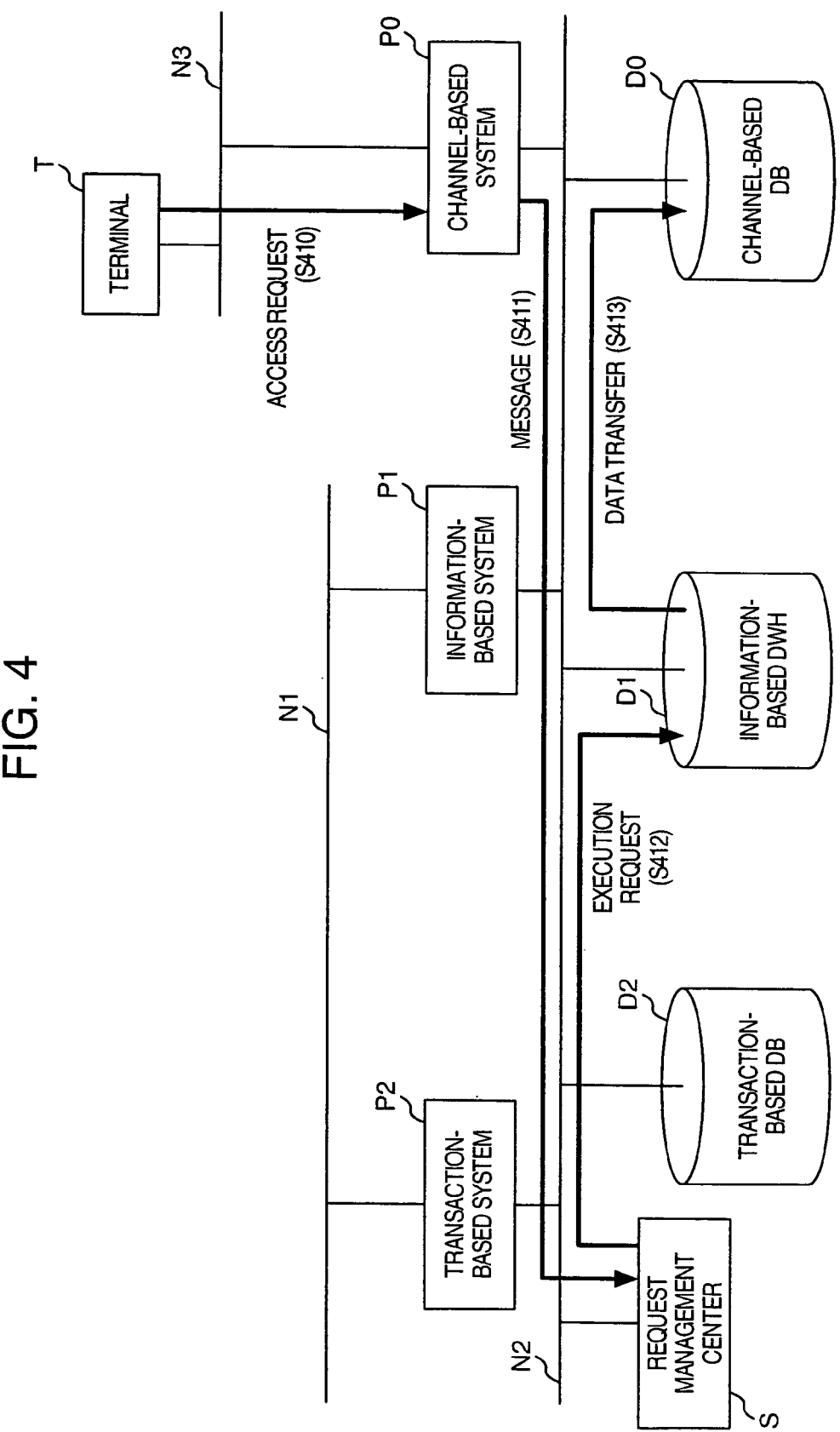
FIG. 4 is a diagram illustrating the configuration of an information system according to a fourth embodiment of the present invention.

FIG. 4 is a diagram illustrating the configuration of an information system which is described as a fourth embodiment of the present invention. FIG. 4 additionally comprises a request management center S connected to the network N2 in addition to the configuration of the third embodiment.

The request management center S stores a message sent from the access intermediation center P0, and monitors the information-based database D1 for an operating condition to transmit a data utilization request when the information-based database D1 has a small processing load. In the following, a feature of this embodiment will be described in detail.

Upon receipt of an access request from the terminal T through the network N3 (S410), the access intermediation center P0 transmits a message for requesting utilization of data in the information-based database D1 to the request management center S through the network N1 (S411).

Upon receipt of the message, the request management center S transmits a processing execution request corresponding to the message to the information-based database D1 (S412). Here, the execution request may include any of processing such as a search, update, delete and filtering, by way of example.

Upon receipt of the execution request, the information-based database D1 executes the processing corresponding to the execution request, and transmits necessary data to the channel-based database D0 through the network N2 (S413). The information-based database D1 receives the data and stores the same.

After the foregoing processing, the channel-based system P0 can access the channel-based database D0 to utilize data in the information-based database D1. The channel-based system utilizes the data to treat, for example, a Web page for transmission to the terminal T.

In the foregoing processing, the request management center S receives a message from the information-based system P1. Also, as described later, the request management center S can store messages. Further, the request management center S monitors the information-based database D1 for an operating condition to transmit a data utilization request to the channel-based database D0, for example, when the information-based database D1 has a small processing load. Therefore, the information system is operated in an efficient manner.

Figure 5:
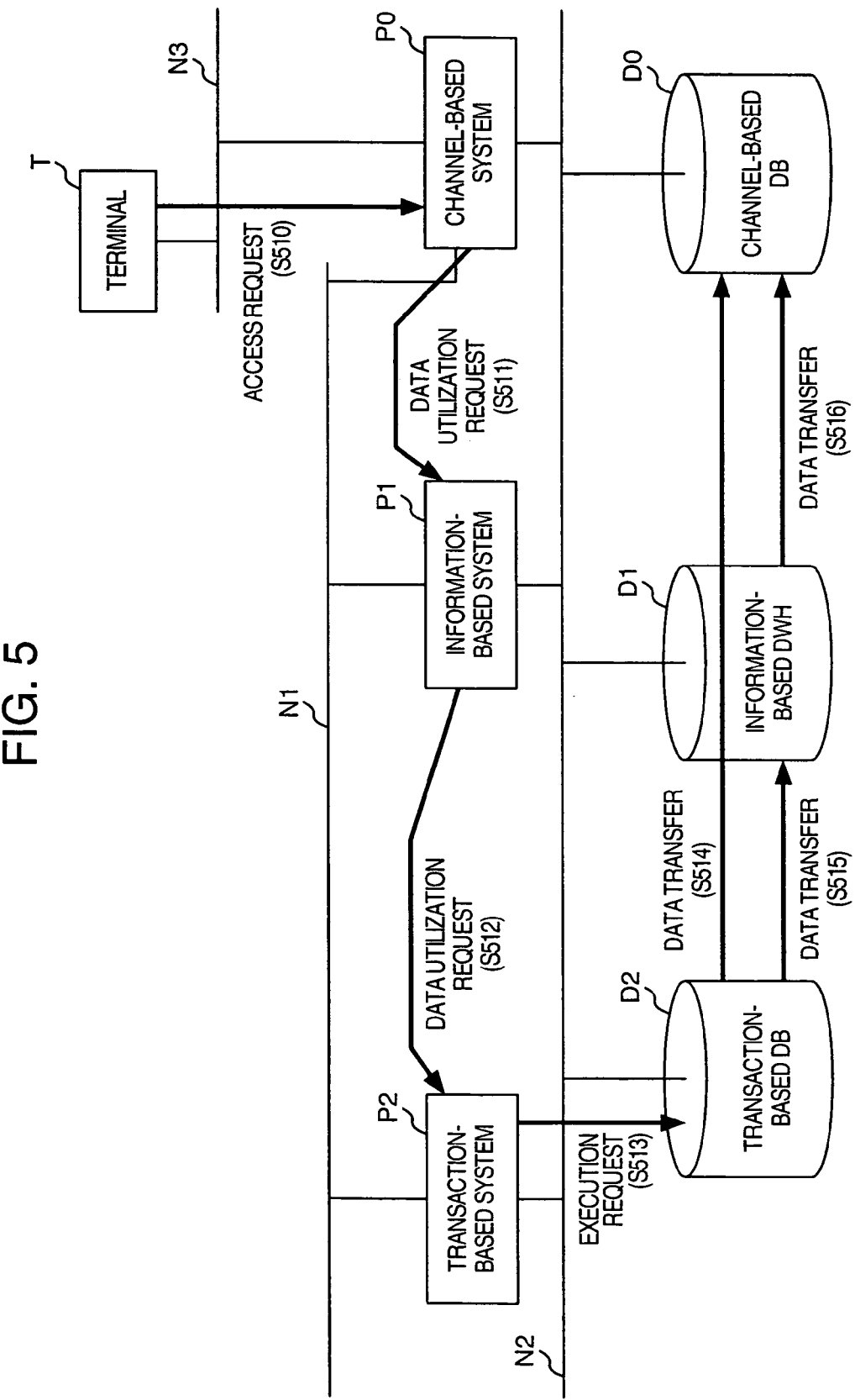
FIG. 5 is a diagram illustrating the configuration of an information system according to a fifth embodiment of the present invention.

FIG. 5 is a diagram illustrating the configuration of a data utilization system which is described as a fifth embodiment of the present invention.

The configuration in FIG. 5 is similar to FIG. 3. In this embodiment, when the channel-based system P0 receives an access request from the terminal T through the network N3 and needs data in the transaction-based database D2 or information-based database D1 for responding to the access request, a data utilization request is transmitted from the channel-based system P0 to the information-based system P1. In the following, a feature of this embodiment will be described in detail.

First, upon receipt of an access request through the network N3 (S510), the access intermediation center P0 transmits a request for utilizing data in the transaction-based database D2 to the information-based system P1 through the network N1 (S511).

Upon receipt of the data utilization request, the information-based system P1 transmits the request for utilizing data in the transaction-based database D2 to the transaction-based system P2 through the network N1 (S512).

Upon receipt of the data utilization request, the transaction-based system P2 transmits a processing execution request corresponding to the data utilization request to the transaction-based database D2 through the network N2 (S513). Upon receipt of the execution request, the transaction-based database D2 executes the processing corresponding to the execution request, and transmits necessary data to the channel-based database D0 through the network N2 (S514). The channel-based database D0 receives the data and stores the same.

In the processing of the execution request, the transaction-based database D2 generates the necessary data in association with the information-based database D1 as required through the network N2. In this event, the necessary data may be transmitted from the information-based database D1 to the channel-based database D0, rather than from the transaction-based database D2 (S515, S516). Such association is required, for example, when the information-based database D1 needs to acquire data extracted from the transaction-based database D2 before data is extracted from the information-based database D1.

Also, as the transaction-based database D2 and information-based database D1 complete the processing corresponding to the data transfer instruction request and processing request, they notify the transaction-based system P2 and information-based system P1 to that effect as required through the network N2. Then, the transaction-based system P2 and information-based system P1, which receive the notification, notifies the channel-based system P0 that the processing has been completed for the data utilization request through the network N1 and the like. In this way, the channel-based system P0 recognizes that the processing corresponding to the data utilization request message has been completed.

Incidentally, in the foregoing processing, a data transfer from the transaction-based database D2 to the information-based database D1, and a data transfer from the information-based database D1 to the channel-based database D0 are performed through the network N2 which is suited to high speed, large amount data communications. For this reason, the traffic will not be increased on the network N1.

Also, since the data transfer is basically performed between the respective databases, resources of the information-based system P1 and transaction-based system P2 will not be consumed during the data transfer.

Figure 6:
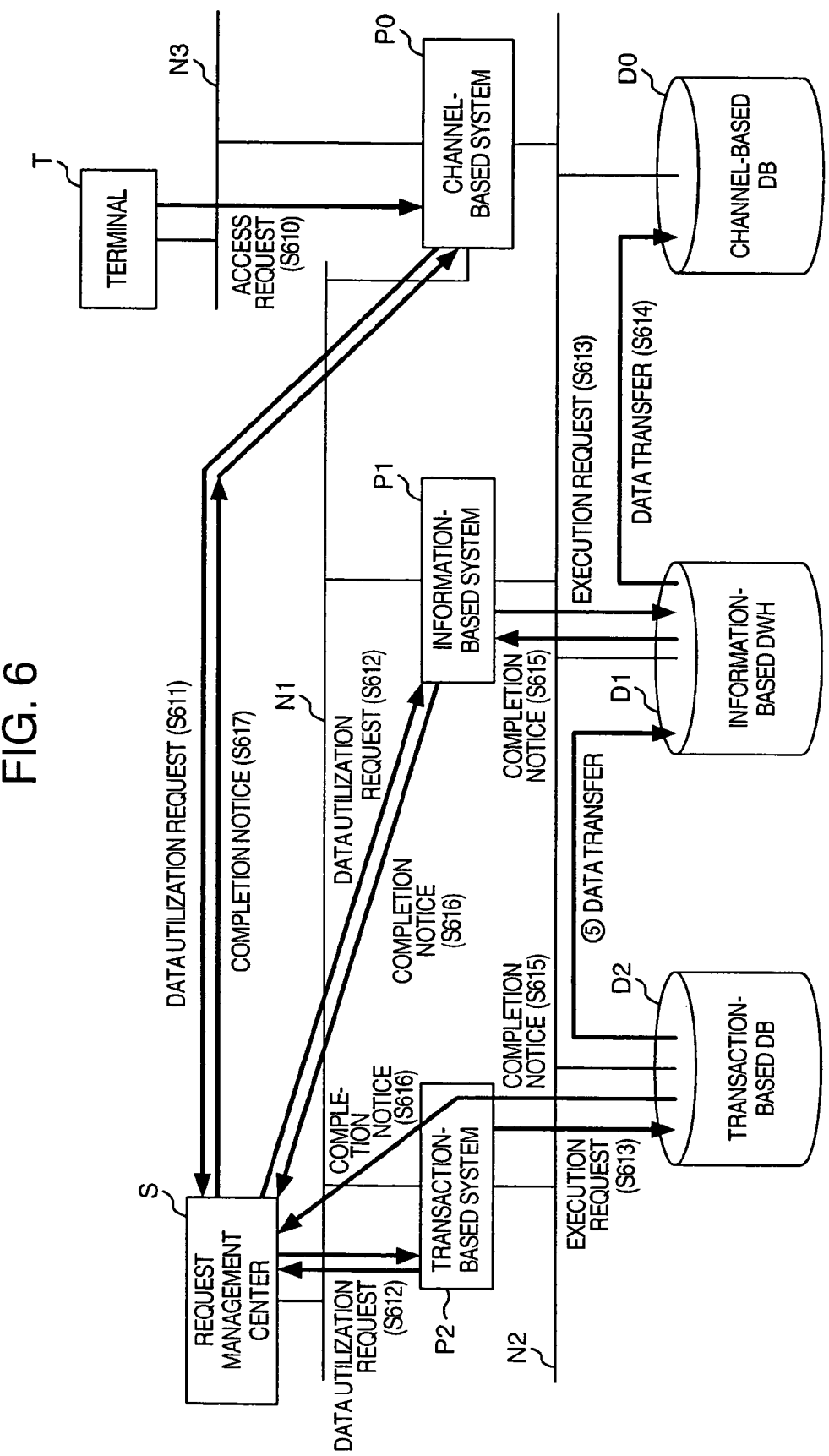
FIG. 6 is a diagram illustrating the configuration of an information system according to a sixth embodiment of the present invention.
Figure 7:
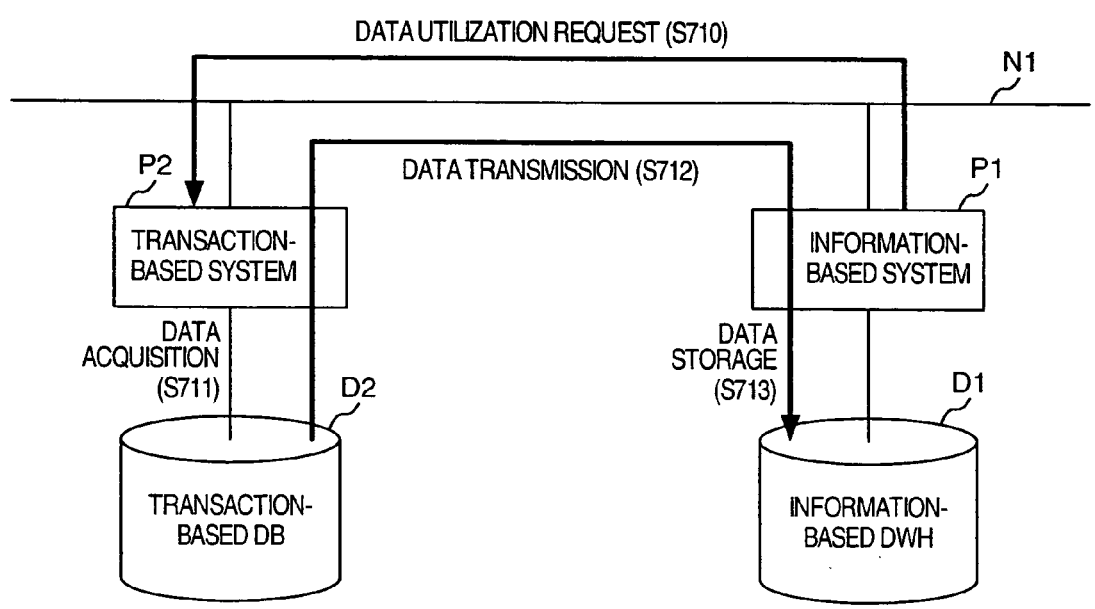
FIG. 7 is a diagram illustrating the configuration of a conventional information system.

FIG. 6 is a diagram illustrating the configuration of a data utilization system which is described as a sixth embodiment of the present invention. While the configuration in FIG. 6 is similar to the configuration in FIG. 4, they differ in that a request management center S connected to the network N1 is provided.

In this embodiment, when the channel-based system P1 receives an access request which involves utilization of the transaction-based database D2 or information-based database D1 from the terminal T through the network N3, the channel-based system P0 does not directly access the database by itself, but it transmits a message to the request management center S, such that the request management center S requests the transaction-based system P2 or information-based system P1 for processing. In the following, a feature of this embodiment will be described in detail.

Upon receipt of an access request through the network N3 (S610), the access intermediation center P0 transmits a message for requesting utilization of data in the transaction-based database D2 or information-based database D1 to the request management center S through the network N1 (S611).

Upon receipt of the message, the request management center S transmits a data utilization request corresponding to the message to the transaction-based system P2 or information-based system P1 through the network N1 (S612). Upon receipt of the data utilization request, the transaction-based system P2 or information-based system P1 transmits a processing execution request corresponding to the data utilization request to the transaction-based database D2 or information-based database D1 through the network N2 (S613). To which system the data utilization request is transmitted, and to which database the execution request is transmitted depend on particular information systems.

Upon receipt of the execution request, the transaction-based database D2 or information-based database D1 executes the processing corresponding to the execution request, and transmits necessary data to the channel-based database D0 through the network N2 (S614). The association of database is also performed as required.

The channel-based database D0 receives the data and stores the same. In this way, the channel-based system P0 can access the channel-based database D0 to utilize data in the information-based database D1. The channel-based system P0 utilizes the data to generate response information to the terminal, and describes it, for example, in a Web page for transmission.

As the transaction-based database D2 or information-based database D1 completes the processing corresponding to the data transfer instruction request and processing request, it notifies the transaction-based system P2 or information-based system P1 to that effect as required through the network N2 or the like (S615). Further, upon receipt of this notification, the transaction-based system P2 or information-based system P1, which receives the notification, further notifies the request management center S that the processing has been completed for the data utilization request through the network N1 and the like (S616).

Upon receipt of the notification, the request management center S recognizes that the processing has been completed for the data utilization request. Also, the channel-based system P0 is notified to that effect as required through the network N1 or the like (S617). In this way, the channel-based system P0 recognizes that the processing corresponding to the message has been completed.

In the foregoing processing, the request management center S monitors the information-based system P1, transaction-based system P2, information-based database D1 and transaction-based database D2 for operating conditions by a function later described to transmit a data utilization request to the channel-based database D0, for example, when the information-based system P1 and transaction-based system P2 or the information-based database D1 and transaction-based database D2 have small processing loads. In this way, the information system is operated in an efficient manner.

The request management center S can store and accumulate received messages to execute processing corresponding to the respective data utilization request messages. The processing is, for example, a processing request to the information-based system P1, transaction-based system P2, information-based database D1, transaction-based database D2, and the like.

An order in which the processing corresponding to respective messages is executed is set in various ways. For example, the processing is performed in accordance with a FIFO (First in First Out) scheme, as is the case with a general data cuing scheme, in accordance with priorities specified in association with the messages, preferentially for those messages which satisfy certain conditions, and the like.

The request management center S also receives information transmitted from the information-based system P1, transaction-based system P2, information-based database D1 and transaction-based database D for indicating whether or not these can accept a processing request from the request management center S, and can determine based on this information whether or not the execution request or the data utilization request corresponding to the message should be transmitted.

The request management center S also has a function of storing a message, receiving a processing completion notice for a data utilization request corresponding to a certain message, and then transmitting a data utilization request corresponding to the other message stored therein.

The request management center S also comprises a function of transmitting the execution request and the data utilization request in accordance with operating situations of the information-based system P1, transaction-based system P2, information-based database D1 and transaction-based database D2.

The request management center S further comprises a function of storing a correspondence of predetermined identification information to one or more of the information-based system P1 or transaction-based system P2, and comparing the identification information, when it is included in the received message, with the correspondence to transmit the data utilization request to a system which is corresponded to the identification information.

On the other hand, the access intermediation center P0 comprises a function of transmitting a massage, a data utilization request, and an execution request corresponding to the access request in accordance with operating situations of the information-based system P1, transaction-based system P2, information-based database D1 and transaction-based database D2.

The access intermediation center P0 also comprises a function of storing a correspondence of predetermined identification information to one or more of the information-based system P1 or transaction-based system P2, and comparing the predetermined identification, when it is included in the access request received from the terminal T, with the correspondence to transmit the processing execution request to the information-based database D1 or transaction-based database D2 which is corresponded to the identification information.

The identification information is, for example, information which identifies the source of the access request.

Incidentally, the systems and databases described above are not necessarily applied to such fields as a transaction system and an information system, but the present invention can be applied to any other service to which the systems and databases are applied.

Figure 8:
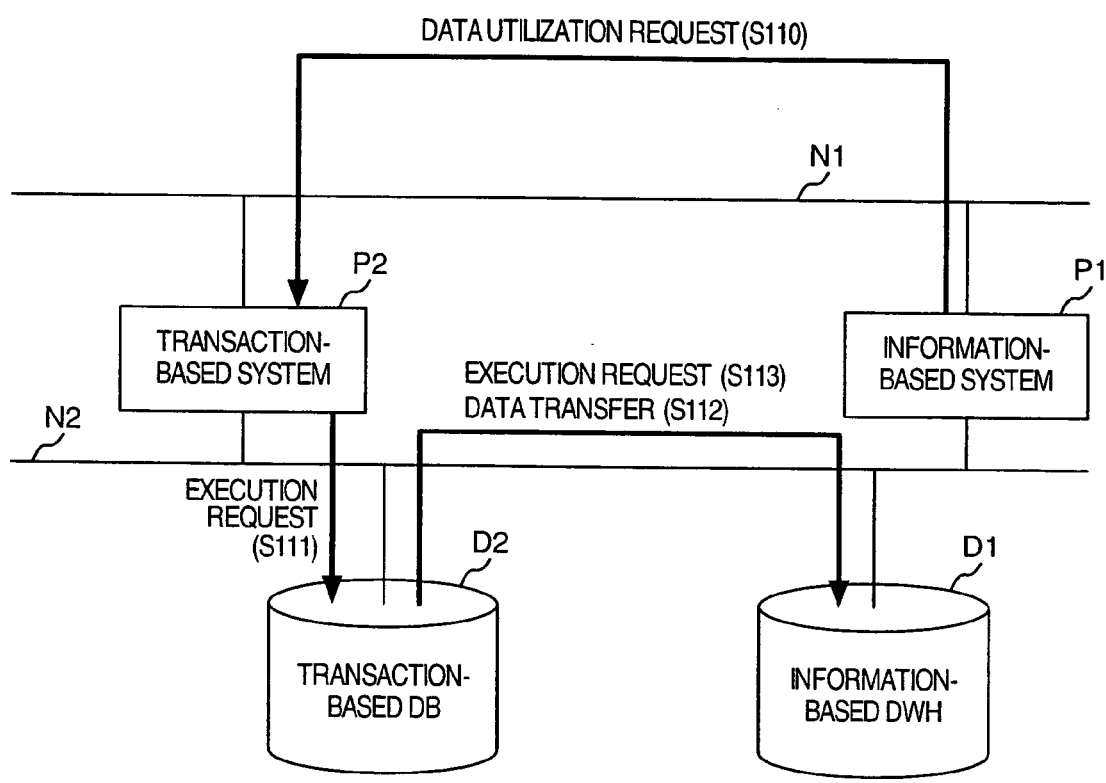
FIG. 8 is a diagram illustrating the configuration of an information system according to a seventh embodiment of the present invention.

FIG. 8 is a diagram illustrating the configuration of an information system which is described as a seventh embodiment of the present invention.

The configuration illustrated in FIG. 8 is basically the same as the configuration illustrated in FIG. 1.

In this information system, description will be made on processing performed when the information-based system P1 needs data in the data provision system D2.

First, the information-based system P1 transmits a request for utilizing data in the data provision system D2 through the network N1 (S110). On the other hand, the transaction-based system P2, which has received the data utilization request, transmits a processing execution request (S111) corresponding to the data utilization request to the transaction-based database D2 through the network N2. Here, the execution request may include any of processing such as a search, update, delete and filtering, by way of example.

Upon receipt of the execution request, the data provision system D2 transmits this execution request and data stored in D2 to the data provision system D1 through the network N2 (S113) (S112).

Upon receipt of the execution request and the data, the information-based database D1 performs the processing in accordance with the execution request, and stores data which is generated as a result. Subsequently, the information-based system P1 accesses the information-based database D1 to utilize the data stored therein.

In this processing, the data transfer from the transaction-based database D2 to the information-based database D1 is mainly performed through the network N2. Also, since the data transfer is mainly performed between the information-based database D1 and transaction-based database D2, resources of the information-based system P1 and transaction-based system P2 will not be consumed during the data transfer.

Figure 9:
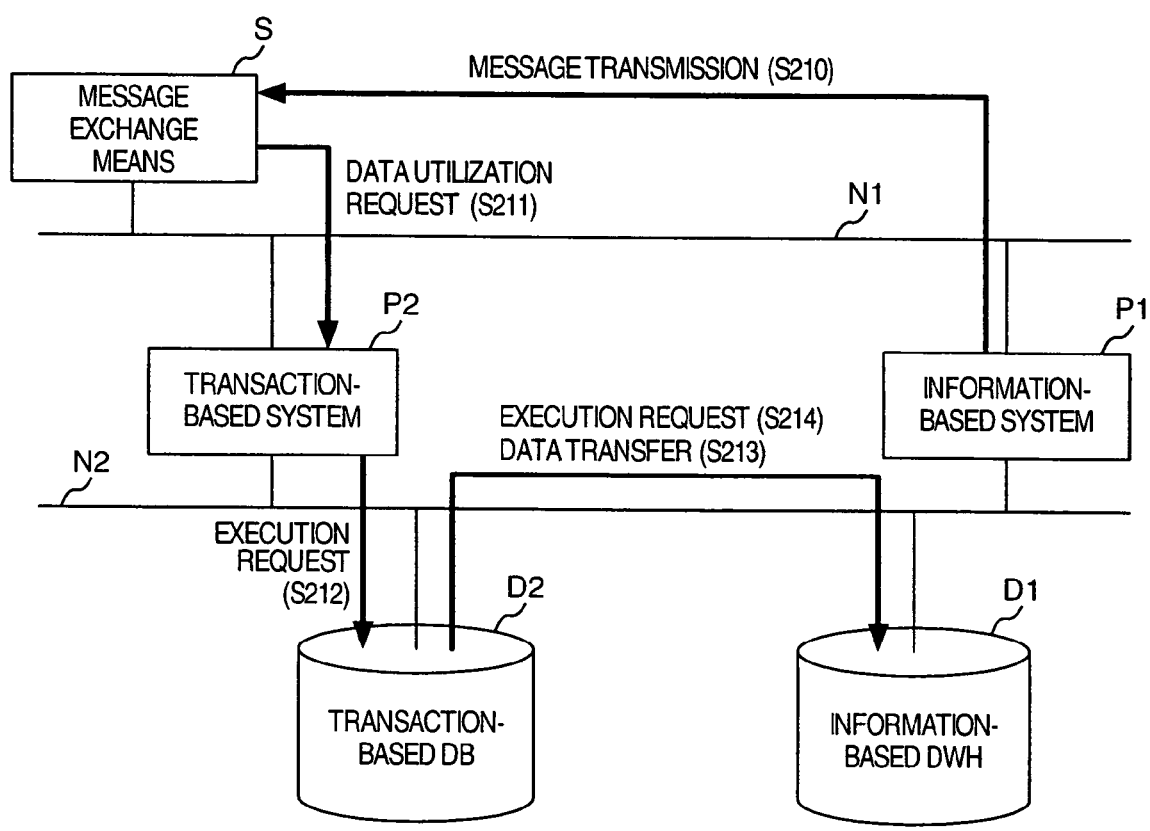
FIG. 9 is a diagram illustrating the configuration of an information system according to an eighth embodiment of the present invention.

FIG. 9 is a diagram illustrating the configuration of the information system P1 which is described as an eighth embodiment of the present invention. The configuration in FIG. 9 is basically the same as that in the seventh embodiment except that the request management center S is connected to the network N1.

Description will be made on the operation of the information system when the information-based system P1 needs data in the data provision system D2, as is the case with the seventh embodiment.

First, the information-based system P1 transmits a message for requesting utilization of data in the transaction-based database D2 to the request management center S through the network N1 (S210). Upon receipt of the message, the request management center S transmits a data utilization request corresponding to the message to the transaction-based system P2 through the network N1 (S211).

Upon receipt of the data utilization request, the transaction-based system P2 transmits a processing execution request corresponding to the data utilization request to the transaction-based database D2 through the network N2

(S212). Here, the execution request may include any of processing such as a search, update, delete and filtering, by way of example.

Upon receipt of the execution request, the transaction-based system D2 transmits this execution request and data stored in D2 to the information-based database D1 through the network N2 (S214) (S213).

Upon receipt of the data, the information-based database D1 performs the processing in accordance with the execution request, and stores data generated as a result. Subsequently, the information-based system P1 accesses the information-based database D1 to utilize the data stored therein.

In the foregoing processing, the action of the request management center S is the same as that in the second embodiment.

Also, in the processing in this embodiment, the data transfer from the transaction-based database D2 to the information-based database D1 is mainly performed through the network N2. Therefore, the traffic will not be increased on the network N1. Also, since the data transfer is basically performed between the information-based database D1 and transaction-based database D2, resources of the information-based system P1 and transaction-based system P2 will not be consumed.

Figure 10:
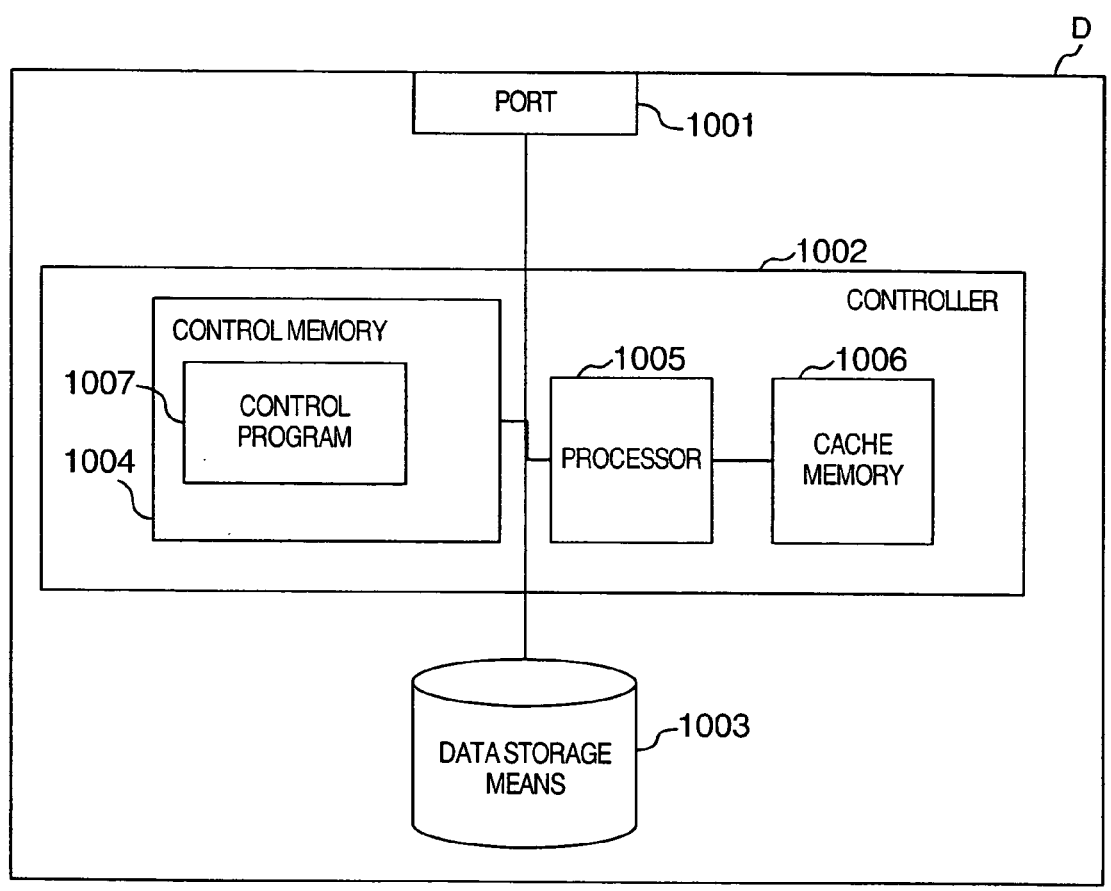
FIG. 10 is an exemplary configuration of a data provision system according to the present invention.

FIG. 10 illustrates an exemplary configuration of a data provision system D. The data provision system D is a storage device system which is comprised of a port 1001 for transmitting and receiving an execution request and data through the network N2; a controller 1002, and a data storage unit 1003 for accumulating and storing data. The controller 1002 comprises a control memory 1004 for storing a program; a processor 1005 for executing the program; and a cache memory 1006 for temporarily storing data stored in the data storage unit 1003. The control memory 1004 stores a control program 1007 which executes processing corresponding to a received processing request. The data storage unit 1003 may be a single disk device, or a disk array having a plurality of disk devices. Alternatively, the data storage unit 1003 may be in a redundant configuration such as RAID. The data storage unit 1003 stores data such as a database for use by the user.

A data utilization system P in turn is a general computer, specifically a device or system which has a processor, a cache memory, an input/output unit, and a storage device.

FIG. 11 illustrates an exemplary execution request transferred from the data utilization system P to the data provision system D. An execution request 1100 is comprised of a processing execution site field 1101 for registering information indicative of the data provision system D for processing data; a processing content field 1102 for registering information indicative of the contents of processing for data; an intervening system field 1103 for registering information indicative of a data provision system through which the execution request 1100 is transferred; and a transfer destination field 1104 for registering information indicative of a data provision system to which data is transferred. The execution request 1100 in FIG. 11 is used at the execution request S111 in FIGS. 1, 8; the execution request S212 in FIGS. 2, 9; the execution request S311 in FIG. 3; the execution request S412 in FIG. 4; the execution request S513 in FIG. 5; and the execution request S613 in FIG. 6 in the aforementioned embodiments.

FIG. 12 illustrates an exemplary execution request transferred from a data provision system to another data provision system. An execution request 1200 has a data field 1201 for storing data which is processed at a destination, in addition to the fields of the execution request 1100 described in FIG. 11. The execution request 1200 in FIG. 12 corresponds to the execution requests used in S112 in FIG. 1; S213 in FIG. 2; S312 in FIG. 3; S413 in FIG. 4; S514, S515, S516 in FIG. 5; S614 in FIG. 6; data which is a combination of S113 and S112 in FIG. 8; and data which is a combination of S214 and S213 in FIG. 9 in the aforementioned embodiments.

FIG. 13 is a diagram illustrating an exemplary procedure for processing a received execution request, performed by the controller 1002 of the data provision system illustrated in FIG. 10 which executes the control program 1007.

The controller 1002 receives an execution request 1100 or an execution request 1200 from a data utilization system or a data provision system through the port 1001 (step 1301). Next, the controller 1002 references the processing execution site field 1101 of the received execution request to determine a data provision system D which performs the processing (step 1302).

When the data provision system D which performs the processing is itself, the controller 1002 performs the processing specified in the processing content field 1102. When the received execution request has the data field 1201, the controller 1002 processes data stored in the data field 1201 to update the data field. When the data field 1201 is not present, the controller 1002 acquires necessary data from the data storage unit 1003 for processing, and creates an execution request which includes the processing result in the data field 1201. The execution request also includes information for specifying data which is to be processed (step 1303).

When the data provision system D which performs the processing is a different data provision system, the controller 1002 acquires data from the data storage unit 1003 and adds the data to the execution request as the data field 1201 when the received execution request does not have the data field 1201 (step 1310).

Next, the controller 1201 references the data transfer destination field 1103 in the execution request to determine whether or not the destination data provision system D is itself (step 1304). When the data transfer destination is itself, the data stored in the data field 1201 is stored in the data storage unit 1003 (step 1308). When the data transfer destination is a different system, the controller 1002 references the intervening system field 1103 of the execution request to determine whether the data is transferred through any intervening system (step 1305).

When the intervening system field 1103 has a value indicative of an intervening system, the controller 1002 deletes the information indicative of the intervening system from the intervening system field 1103. For example, when the intervening system field 1103 stores information indicative of a plurality of intervening systems in order from the top of the field, the controller 1002 selects the information stored at the top for deletion from the intervening system field 1103 (step 1306). Subsequently, the controller 1002 transfers the execution request to the deleted intervening system (step 1307). When there is no information indicative of intervening systems, the controller 1002 transfers the execution request to the data provision system D described in the transfer destination field 1103 (1309).

In the following, description will be made how the processing in FIG. 13 is specifically performed in each of the data provision systems in the respective embodiments described above.

First, description will be made on the processing executed in the data provision system D (hereinafter called the "source." The transaction-based DB in the first embodiment) which first receives the execution request, as illustrated in the first embodiment. In this event, an execution request 1110, specifically, an execution request 1110a is sent from the data utilization system P2 to the source. Upon receipt of the execution request 1110a, the source initiates the processing illustrated in FIG. 13. First, the source receives the execution request 1110a (step 1301). Next, the source references the processing execution site field 1101 of the execution request 1110a. In this event, the value stored in the processing execution site field 1110 is D2, so that the processing execution site is the source (step 1302). Next, the source performs the processing specified in the processing content field 1102 of the execution request 1110a. In this event, since the execution request 1110a is not given the data field 1201, the source acquires necessary data from the data storage unit 1003 possessed by the source to perform the processing described in the processing content field 1102 (in this example, sort and totalization), and creates a processing request 1210a which reflects the result. The processed data is stored in the data field 1201 of the processing request 1210a (step 1303).

Next, the source references the transfer destination field 1104 of the processing request 1201a to determine whether or not the transfer destination is the source (step 1304). In this event, since the value stored in the transfer destination field 1104 is D1 which does not indicate the source, the source determines with reference to the intervening system field 1103 whether or not there are intervening systems (step 1305). In this event, since the intervening system field 1103 stores no value, the source transfers the processing request 1210a to the data provision system D1 described in the data transfer destination field 1104 through the network N2 (step 1309).

Next, description will be made on the specific processing procedure in FIG. 13 in the data provision system D1 which receives the processing request 1210a from the source. Upon receipt of the processing request 1210a (step 1301), the data provision system D1 determines a processing execution site (step 1302). In this event, since the processing execution site field 1101 has a value D2 which does not indicate the data provision system D1 itself, the data provision system D1 determines a transfer destination (step 1304). In this event, since the value stored in the transfer destination field 1104 is D1 which indicates the data provision system D1 itself, the data provision system D1 stores data stored in the data field 1201 of the processing request in the data storage unit 1003 of the data provision system D1 (step 1308). As a result, a data transfer and exchange can be enabled only by the data provision system D and network N2, thereby reducing a load on the data utilization system P and first network N1.

Next, description will be made on the data processing performed in a data provision system D which eventually receives a processing request (hereinafter, the "target." The information system DWH in the seventh embodiment), as illustrated in the seventh embodiment.

In this event, an execution request as indicated by 1110b in FIG. 11 is first sent from the data utilization system P2 to the source. Upon receipt of the execution request 1110b (step 1301), the source references the processing execution site field 1101 of the execution request 110b. In this event, the value is D1 (target), indicating that the processing execution site is not the source (step 1302). Therefore, the source next determines a data transfer destination (step 1304). In this event, the value stored in the transfer destination field 1104 is D1 (target) but not the source, so that the source determines whether or not there are intervening systems. In this event, since no value is stored in the intervening system field 1103, the source determines that there are no intervening systems (step 1305). Subsequently, the source transfers data to the transfer destination (target). However, since the execution request 1110a is not given the data field 1201, the source acquires the data from the data storage unit 1003, adds the acquired data to the processing request 1110b to create a processing request 1210b. Then, the source transfers the processing request 1210b to a target described in the data transfer destination field 1104 using the network N2 (step 1309).

Upon receipt of the processing request 1210b from the source (step 1310), the target determines the processing execution site (step 1302). In this event, since the value stored in the processing execution site field 1101 is D1 indicative of the target, the target performs the processing described in the processing content field 1102. In this event, since the processing request 1210b has the data field 1201, the target processes the data stored in the data field 1201 (step 1303). Next, the target determines the transfer destination (step 1304). In this event, since the value stored in the transfer destination field 1104 is D1 indicative of the target, the target stores the data stored in the data field 1201 of the processing request 1210a in the data storage unit 1003 possessed by itself (step 1308). In this way, the target performs the conversion processing which involves a high load, thereby making it possible to avoid affecting a data utilization system which accesses the source.

According to the present invention, the information system provided thereby can accomplish more efficient operations.

While the foregoing description has been made on the embodiments, it should be apparent to those skilled in the art that the present invention is not limited to them, but a variety of modifications and alternations can be made thereto without departing from the spirit and scope of the present invention defined by the appended claims.

What is claimed is:

1. A data access method comprising the steps of:
    transmitting a first request, from a first server device connected to a first network to a second server device connected to a second network, asking for usage of data which have been stored in a first storage device connected to the first network, the second server device and the first storage device being connected via the second network;
    transmitting a second request, in response to a reception of the first request at the second server device, from the second server device to the first storage device, asking for data processing in accordance with the first request;
    processing the data at the first storage device upon receipt of the second request; and
    transmitting data processed at the first storage device to a second storage device after completion of processing data via the second network to reduce traffic in the first network, the data transmitted to the second storage device being used by the first server device.

2. A data access system comprising:
    a first server device connected to a first network for transmitting a first request;
    a second server device connected to a second network for receiving the first request transmitted from the first server device, and for transmitting a second request in response to the first request;
    a first storage device connected to the first network, the second server device and the first storage device being connected via the second network for receiving the second request transmitted from the second server device, for processing data which have been stored therein according to the second request, and for transmitting the data processed; and a second storage device for receiving the data transmitted from the first storage device via the second network to reduce traffic in the first network.

3. The data access system according to claim 2, wherein the first request is transmitted through a first network, and wherein the second request and the data processed at the first storage device are transmitted through a second network.

4. The data access system according to claim 2, wherein the second storage device comprises a plurality of storage units, each of the plurality of units sequentially receiving the data.

5. A data access system comprising:

a first server device for transmitting a first request;

a second server device for receiving the first request transmitted from the first server device, and for transmitting a second request in response to the first request;

a first storage device for receiving the second request transmitted from the second server device, for processing data which have been stored therein according to the second request, and for transmitting the data processed;

a second storage device for receiving the data transmitted from the first storage device; and a third server device provided between the first server device and the second server device for provisionally receiving the first request directed to the second server device, for monitoring a load for processing data at the first storage device, and for transmitting the first request toward the second server device in accordance with the load monitored.

6. A data access system comprising:

a first server device for transmitting a first request through a first network;

a second server device for receiving the first request transmitted from the first server device, and for transmitting a second request in response to the first request through a second network to a first storage device at which data are processed according to the second request and the data processed thereat are transmitted through the second network;

a third server device provided between the first server device and the second server device for provisionally receiving the first request, for monitoring a load for processing data at the first storage device, and for transmitting the first request tentatively received thereat in accordance with the load monitored toward the second server device through the second network;

a second storage device including a plurality of storage units for receiving the data transmitted from the first storage unit.

* * * * *